June 14, 1960  C. D. CUPP  2,940,471

SPRING-LOADED CHECK VALVE

Filed March 19, 1956

INVENTOR.
Charles D. Cupp
BY
Walter H. Popp.
Attorney.

United States Patent Office 2,940,471
Patented June 14, 1960

2,940,471
SPRING-LOADED CHECK VALVE

Charles D. Cupp, Lancaster, N.Y., assignor to Scott Aviation Corporation, Lancaster, N.Y.

Filed Mar. 19, 1956, Ser. No. 572,274

10 Claims. (Cl. 137—527.6)

This invention relates to a check valve, and more particularly to a spring-loaded, exhalation valve for the face mask of an open-circuit breathing apparatus.

The primary object of the invention is to provide a check valve which is held in its closed position by a resilient force which decreases in intensity as the valve opens, i.e., in which the resilient resistance to valve opening decreases as the amount of flow increases. Other collateral objects of the invention and practical solutions therefore are disclosed in the following description and in the appended drawing wherein.

Figure 1:
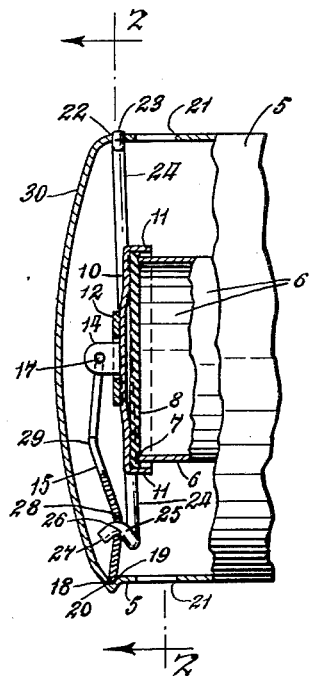
Fig. 1 is a fragmentary, vertical, longitudinal section thru one form of my improved check valve.
Figure 2:
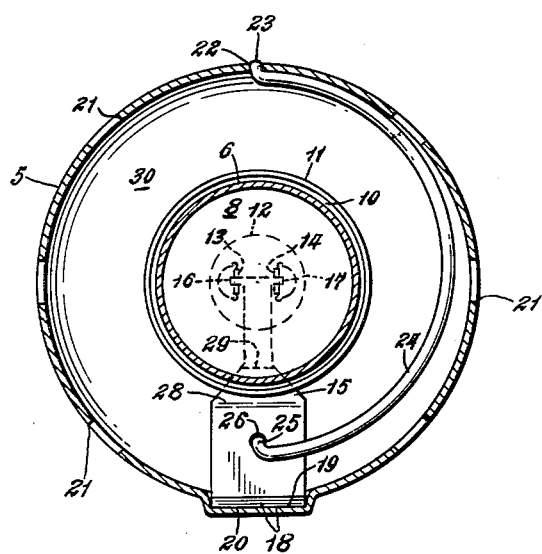
Fig. 2 is a vertical, transverse section thereof taken on line 2—2, Fig. 1.

The form of the invention shown in the accompanying drawing will be described exactly as it is there illustrated, but it is to be understood that the scope of the invention is broader and is to be measured solely by the scope of the appended claims.

The main casing 5 of the check valve is provided with a control tube 6 whose interior receives the compressed gases which are to be vented from the valve. These compressed gases which are to be vented may consist of the foul air and other gases which are vented from the face mask of an open-circuit breathing apparatus, or they may be any other gases or fluids which are to be vented whenever the pressure of the gases or fluids in tube 6 rises above a certain pressure, and are discharged from the check valve, but are prevented from returning at any time even when the pressure in said tube 6 drops below this certain pressure. To this extent the present invention acts just like an ordinary conventional, spring-loaded, check valve.

The outer end of tube 6 terminates in an annular valve seat 7 which is normally engaged by a soft rubber gasket 8 that is cemented to the inner, transverse surface of a sheet-metal valve disk 10, the latter being preferably provided peripherally with a rearwardly extending annular flange 11. The latter prevents the valve disk 10 from becoming distorted and, in addition, prevents said valve disk 10 from chattering, by directing the vented gases in a rearward direction after they pass laterally outwardly over the valve seat 7.

Soldered coaxially to the front, vertical face of the valve disk 10 is an annular, sheet-metal, pivot plate 12 which is stamped out diametrically to form a pair of pivot ears 13, 14. Arranged between said pivot ears and pivoted to them is the upper end of a sheet-metal, valve lever 15, the latter being provided with a pair of stamped-out, laterally-projecting prongs 16 and 17 which engage companion holes stamped in the ears 13 and 14.

The lower, wide end of the sheet-metal valve lever 15 is bevelled at the lower corners of each of its substantially vertical faces to form a relatively sharp, pivot edge 18 which is received in, and is adapted to rock in, a V-shaped, rectilinear depression or socket 19 which is suitably stamped in the lower part of the valve casing 5. This provides a very inexpensive way of, in effect, pivotally connecting the lower end of the valve lever 15 to the valve casing 5 and constituting a fulcrum 20.

When the valve disk 10 opens outwardly forwardly the compressed gases travel out of the central tube 6 and over the valve seat 7 and then pass out of the valve casing thru the vent holes 21.

The upper side of the valve casing 5 is pierced to form a hole 22 which receives a sharply-upwardly-bent tongue 23 that is formed at the upper end of a C-shaped, wire, compression spring 24. The lower end of the latter is first bent vertically upwardly and forwardly at 25 and then passes thru a suitable hole which is medially punched in the lower end of the valve lever 15. This provides in effect, a pivotal connection or pivot 26 between the lower end of the C-shaped spring 24 and the valve lever 15. The distal, lower end of said C-shaped spring 24 is bent sharply forwardly and downwardly at 27 to prevent disengagement of said spring from said valve lever.

In the position of the various valve members shown in the drawing, the C-shaped spring 24 is under relatively light compression, and the consequent downward thrust on its lower pivot 26 acts to resiliently urge the valve lever 15 in a clockwise direction, as seen in Fig. 1, about its fulcrum 20. This is because the pivot 26 is positioned rearwardly (to the right) of a plane passing thru hole 22 and fulcrum 20. This effect is obtained by bending the lower end of the valve lever 15 slightly rearwardly at 28.

When the valve disk 10 is opened (forwardly) under the pressure of the gases in tube 6, the C-shaped spring 24 will be compressed still more than the amount to which it is compressed in the position shown in the drawing. But this increase in the resilient resistance of the C-shaped spring 24 is not proportional to the displacement of the valve disk 10. This is because in the case of a C-shaped spring the rate of increase of resilient resistance decreases as the total resilient resistance increases. (This is true, of course, only when the C-shaped spring is under compression and not when it is under tension.)

The result of this, as far as the C-shaped spring 24 is concerned, is that, as the valve disk 10 opens, the resilient resistance to its opening increases at a decreasing rate, and thereby allows a greater volume of gas to flow thru the valve when it is opening than would be the case if the rate of increase were constant (as with an ordinary spring) or were increased.

But this characteristic of the C-shaped spring 24 is only one part of the whole problem relative to the resilient resistance to opening of the valve disk 10.

As the valve disk 10 opens (i.e., moves forwardly) the pivot 26 gets closer to the plane which passes thru the hole 22 and the fulcrum 20, i.e., it gets closer to a dead center position. As this is happening, the effective lever arm of the resilient force imposed by the C-shaped spring 24 acting upon the valve lever 15 decreases. Hence, even tho the C-shaped spring 24 exerts a somewhat greater force as the valve disk 10 opens, its effective lever arm or leverage decreases to such an extent that the total resilient resistance to forward movement of said valve disk 10 decreases as said valve disk continues to open. In other words, the greater the fluid flow thru the valve the less the resilient resistance exerted against the valve disk 10.

It is desirable that the pivot 26 never quite get to its dead center position because, if it did, it would cause the valve to become locked in its open position and this would be, of course undesirable. To prevent this happening, the upper end of the valve lever 15 is bent forwardly at 29 so as to have this portion of said lever strike the inner or rear surface of the end plate 30 of the valve casing 5 before said lever reaches dead center.

This invention is not only useful as a spring-loaded check valve which functions as an exhalation valve for the mask of a breathing apparatus, but also is useful as a pop-off valve, or as a relief valve, or to operate similarly to an ordinary check valve in a gas or liquid pipe line, in fact wherever a check valve is desired having a decreased resistance to fluid flow as the volume of flow increases.

I claim:

1. A spring-loaded check valve comprising: a valve casing having a valve seat; a valve disk movably connected with said casing on a valve lever and adapted to engage said valve seat; and a C compression spring directly connecting said casing and said lever in such a manner whereby it urges said valve disk toward its closed position, the resilient force exerted by said C compression spring upon said lever being imposed with a decreasing leverage upon said lever relatively to said casing as the valve opens, and the total effectiveness of the resilient force of said C compression spring decreasing in intensity as the valve disk opens.

2. A spring loaded check valve comprising: a valve casing having a valve seat; a valve lever movably connected with said valve casing; a valve disk connected with said lever and adapted to engage said valve seat; and a C compression spring directly connecting said lever and said casing in such manner as to provide a resilient force opposing the opening of said valve disk, said resilient force tending to rotate said lever relatively to said casing in a clockwise direction whereby the perpendicular distance from the fulcrum of said lever to the line through which said resilient force acts, decreases as said valve moves away from its closed position.

3. As in claim 2 with the valve disk movably connected with the valve lever.

4. As in claim 2 with means for preventing the valve lever from moving to a dead center position.

5. As in claim 2 with the valve lever fulcrumed on the valve casing on a bevelled edge.

6. A spring loaded check valve comprising: a valve casing having a valve seat; a valve adapted to seat upon said valve seat; a lever fulcrumed on said casing and swingable in a longitudinal plane and pivotally connected on a transverse pivot with said valve; a transversely disposed, C compression spring fulcrumed at one end on said casing and pivotally connected at its other end with said lever; and means for preventing said lever from moving to its dead center position.

7. A spring loaded check valve as in claim 6 with the fulcrum of the lever being of the knife-edge type.

8. A spring loaded check valve as in claim 6 with the fulcrum of the spring being of the loose hole type.

9. A spring loaded check valve as in claim 6 with the lever being of S shape with its pivotal connection with the C spring being at the bend of the S, which is nearest the plane of the valve seat, and the bend of said S, which is furthest from the plane of the valve seat, being adapted to bear against the valve casing before allowing the lever to reach a dead center position.

10. A spring loaded check valve as in claim 6 with said casing, valve, and lever being constructed of sheet metal.

References Cited in the file of this patent

UNITED STATES PATENTS

| | | |
|---|---|---|
| 980,188 | Blauvelt | Jan. 3, 1911 |
| 1,330,265 | Hinton | Feb. 10, 1920 |
| 1,871,536 | Le Bus | Aug. 16, 1932 |
| 2,419,318 | Johnson | Apr. 22, 1947 |

FOREIGN PATENTS

| | | |
|---|---|---|
| 264,043 | Great Britain | Jan. 13, 1927 |